(12) United States Patent  
Ramaswamy et al.

(10) Patent No.: US 8,671,398 B2  
(45) Date of Patent: Mar. 11, 2014

(54) WORKING SET PROFILER

(75) Inventors: Subramanian Ramaswamy, Redmond, WA (US); Mohamed Abd El-Aziz, Kirkland, WA (US); Ashok C. Kamath, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 13/099,393

(22) Filed: May 3, 2011

(65) Prior Publication Data

US 2012/0284490 A1     Nov. 8, 2012

(51) Int. Cl.
     *G06F 9/44*      (2006.01)
(52) U.S. Cl.
     USPC ........... 717/133; 717/124; 717/127; 717/128; 717/132
(58) Field of Classification Search
     USPC .......................... 717/133, 124, 127, 128, 132
     See application file for complete search history.

(56) References Cited

U.S. PATENT DOCUMENTS

| | | | |
|---|---|---|---|
| 6,539,456 | B2 | 3/2003 | Stewart |
| 2004/0088375 | A1 | 5/2004 | Sethi et al. |
| 2006/0053414 | A1* | 3/2006 | Bhandari et al. .............. 717/133 |
| 2010/0268927 | A1* | 10/2010 | De Ven .............................. 713/2 |

OTHER PUBLICATIONS

Jung, et al., "Minimizing Program Startup Time by I/O Activity Mining", Retrieved at <<http://mkseo.pe.kr/archives/mining_prefetch.pdf>>, Retrieved Date: Mar. 7, 2011, pp. 1-5.
Goldberg, Jossef., "Improving WPF applications startup time", Retrieved at <<http://blogs.msdn.com/b/jgoldb/archive/2007/10/10/improving-wpf-applications-startup-time.aspx >>, Oct. 10, 2007, pp. 8.
"Analyzing and Improving Gnome Startup Time", Retrieved at <<http://people.gnome.org/~lcolitti/gnome-startup/analysis/>>, Retrieved Date: Mar. 7, 2011, pp. 14.
Lee, et al., "Reducing Startup Latency in Web and Desktop Applications", Retrieved at <<http://www.cs.washington.edu/homes/baer/ntsymp99.pdf>>, in Windows NT Symposium, 1999, pp. 5.
Caldato, Claudio., "Improving Application Startup Time", Retrieved at <<http://msdn.microsoft.com/en-us/magazine/cc163655.aspx>>, Retrieved Date: Mar. 8, 2011, pp. 6.

* cited by examiner

*Primary Examiner* — Qamrun Nahar
(74) *Attorney, Agent, or Firm* — Kevin Sullivan; Kate Drakos; Micky Minhas (57) ABSTRACT

A working set profiler can monitor an execution of a program or can monitor a user-specified portion of a program to identify methods executed within the monitored execution and associate memory page accesses with each of the identified methods. Memory page accesses are categorized as shared or exclusive, where a shared page is a page that is accessed by more than one method and where an exclusive page is a page that is accessed by only one method in the monitored portion of the program. A call tree can be constructed and augmented with the collected information regarding memory page accesses. Further, for shared pages, the name of the method with which a particular method shares the page access can be collected. The augmented call tree information can be analyzed and prioritized to identify methods whose elimination would reduce program latency.

20 Claims, 5 Drawing Sheets

WORKING SET PROFILER

BACKGROUND

In modern software environments, memory usage and hard disk accesses can contribute significantly to application and website startup time and to the time it takes for a program to become responsive to a user action. Disk access can contribute to latency because of the time it takes to position a read/write head over a requested track. Similarly, memory usage can contribute to latency because of the time it takes to move data into and out of memory and because of transfers of data from one type of memory to another type of memory.

SUMMARY

Profile information for a computer program including the set of methods or referenced data responsible for memory accesses can be identified by monitoring an executing program or a portion of an executing program. Memory accesses can result in I/O operations including but not limited to disk accesses. Memory accesses can include dynamic memory allocations. The monitored portion of the program can comprise a critical path. The portion of the program that is monitored can be user-specified. The methods executed during the monitored portion of the program can be tracked. A set of memory accesses made by each executed method in the monitored portion can be determined. One or more call chains comprising a sequence of executed methods can be created. One or more call chains can be aggregated into a call tree. The type of access to a page in memory (shared or exclusive) can be determined for each access made by an executed method in the call chain. For shared memory accesses the methods that access the same page of memory can be determined. The methods of the call tree can be augmented with the number of exclusive and shared memory page accesses. The methods of the call tree can be augmented with the name of one or more methods with which the method shares the page access.

The information in the call tree can be analyzed to provide information that can be used to identify areas in the program that if changed, would decrease application startup latency and improve response time. Information regarding relationships between method execution, memory accesses, types of memory accesses, I/O operations and memory consumption can be provided. Data derived from the augmented call tree can be used to identify methods that if eliminated or postponed to an area outside the critical path would result in improved program response time.

Avoiding or eliminating memory accesses can decrease the memory consumption of the program and consequently increase responsiveness of a program or portion of a program, whether during startup or in response to a user action. Postponing memory accesses can improve response time of applications by postponing memory accesses to a portion of the program that lies outside a critical path portion of the program. Postponing memory accesses to a region outside of the startup critical path can result in a proportional decrease to the startup latency of a program. Postponing memory accesses to a region of the program outside of a non-startup critical path portion of the program can result in a proportional decrease to the response time of the program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Tools that track the first access to a page in memory are available. However, first memory page access information alone does not make it possible to defer or avoid memory accesses because eliminating a particular reference resulting in an access may result in the access appearing later as a result of subsequent accesses to the same page from other parts of the program within a critical path.

In accordance with aspects of the subject matter disclosed herein, methods or functions and execution or call chains (execution paths for a particular execution of a program or portion of a program) can be monitored. Call chains can be used to identify why a memory page was accessed. All accesses to one or more memory pages can be tracked. By tracking all accesses to memory and by categorizing the accesses, it may be possible to avoid memory accesses or defer memory accesses to a part of the program that is not part of a critical path. Memory page accesses can be categorized as shared or exclusive. Accesses that are exclusive are touched by a particular call chain execution. Shared accesses are touched as a result of the execution of multiple different call chains.

The relationships between code references and memory accesses and code references and disk accesses can be identified and prioritized. Information can be prioritized based on memory access by listing methods in decreasing order of number of exclusive page accesses. Information can be prioritized by an algorithm that computes a priority value based on the smallest number of methods that access the greatest number of shared pages. Other ways of prioritizing information from the augmented call tree are contemplated. The information can be displayed on a monitor or display screen or can be used to generate a printed report. The information can be used to help a user change program code to improve program response time by eliminating or postponing the part of the call chains that reference memory pages. While the subject matter disclosed herein is described with respect to program code memory accesses, it will be understood that these methodologies can be directed to reducing the consumption of allocated memory or heap memory resulting from allocation of program data or reducing the number of methods that are JIT-compiled by studying the relationships between executed methods and memory accesses. It will be appreciated that the subject matter described herein applies to code that executes in a virtual machine environment or to native (unmanaged) code.

Working Set Profiler

Figure 1:
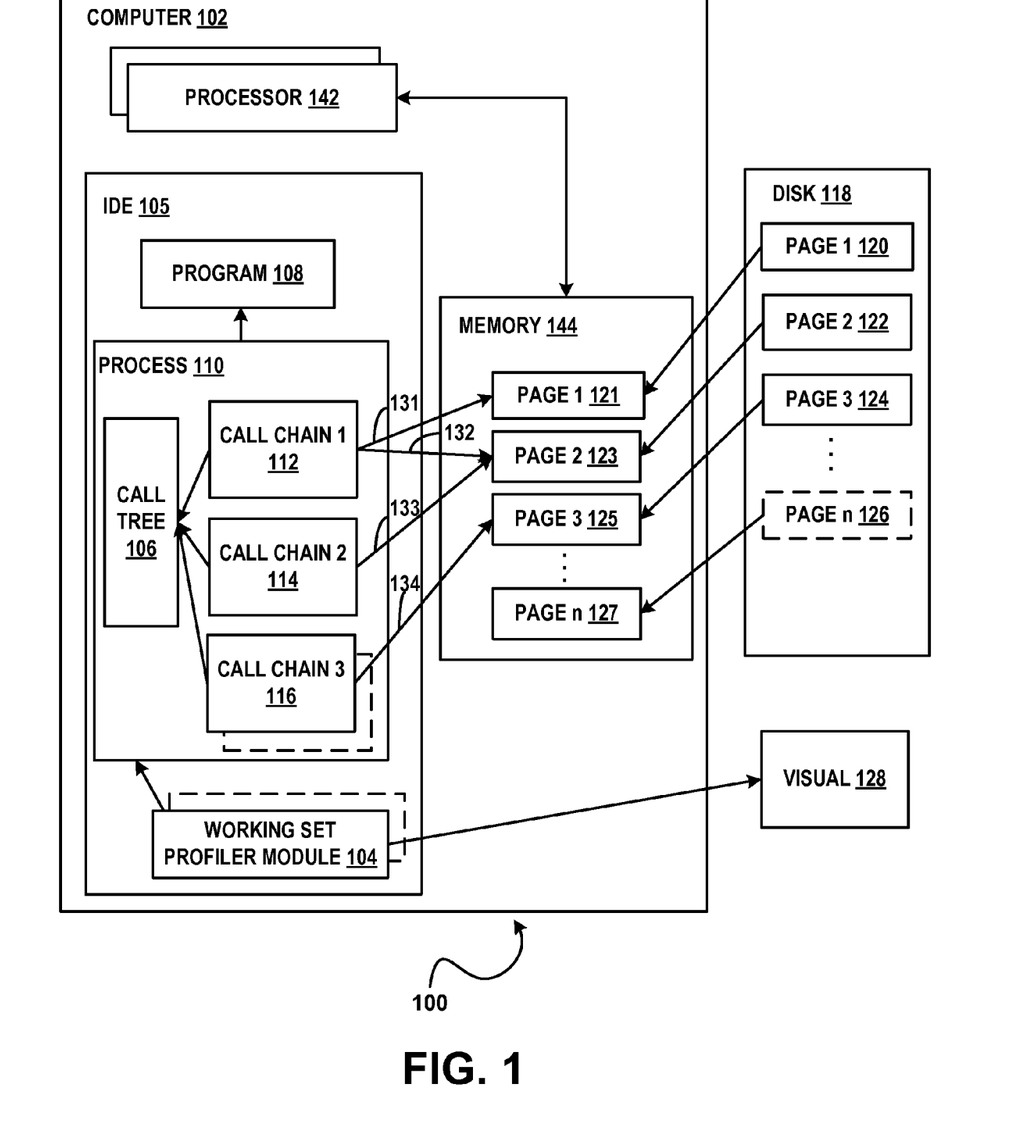
FIG. 1 illustrates an example of a system 100 that profiles a working set associated with a portion of computer code in accordance with aspects of the subject matter disclosed herein.

FIG. 1 illustrates an example of a system 100 for collecting and presenting working set profile information in accordance with aspects of the subject matter disclosed herein. The working set of a process refers to the collection of information (e.g., memory pages) referenced by the process during a particular time interval. All or portions of system 100 may reside on one or more computers such as the computers described below with respect to FIG. 3. System 100 may execute on a software development computer such as the software development computer described with respect to FIG. 4. System 100 may execute within an IDE such as IDE 105. IDE 105 can be an IDE such as the one described with respect to FIG. 4 or can be any other IDE. All or portions of system 100 may be implemented as a plug-in or add-on.

System 100 may include one or more of a computer 102 comprising: one or more processors such as processor 142, etc., a memory such as memory 144, and one or more modules for collecting and presenting working set profile information such as working set profiler module(s) 104, etc. as described herein. Other components well known in the arts may also be included but are not here shown. It will be appreciated that one or more modules for collecting and presenting working set profile information such as working set profiler module(s) 104 etc. can be loaded into memory 144 to cause one or more processors such as processor 142 to perform the actions attributed to the one or more modules that collect and present working set profile information.

Working set profiler module(s) 104, etc. can include a module that monitors an execution of a program (e.g., program 108) or a portion of an execution of a program and determines the methods that were executed in that program or that were executed in that portion of a program. Working set profiler module(s) 104, etc. may include a data collection module that monitors program execution or monitors a portion of program execution, and records all the methods being executed along with all memory pages the recorded methods touch during their execution. Working set profiler module(s) 104, etc. may include a data analysis module that processes the information recorded by the data collection module to create call trees and can augment the call tree with memory access types (e.g., shared or exclusive) and other information. The data can be presented to a user and can help the user identify portions of program execution that can be eliminated or delayed to reduce memory accesses and improve program startup and/or responsiveness.

System 100 may also include one or more programs such as program 108. Program 108 can be executed in a process such as process 110. System 100 may also include one or more disks or other storage media such as disk 118. A disk such as disk 118 can comprise one or more pages such as page 1 120, page 2 122, page 3 124 . . . page n 126. When a disk page such as page 1 120, page 2 122, page 3 124 . . . page n 126 is accessed, the disk page can be copied into memory 144. For example, disk page 1 120 can be copied into page 1 121 in memory 144, disk page 2 122 can be copied into page 2 123 in memory 144, disk page 3 124 can be copied into page 3 125 in memory 144 . . . to disk page n 126 which can be copied into page n 127 in memory 144. Results of the working set profiler modules(s) 104, etc. represented in FIG. 1 by visual 128, can be displayed on a display screen or printed out in report form on a printer, etc.

In operation, working set profiler module(s) 104, etc. can monitor the execution of program 108 or can monitor a part or portion of the execution of program 108. For example, under user direction, the working set profile module(s) 104, etc. can monitor the startup of a program (e.g., from a point at which the program is initiated until a point at which the program becomes responsive to the user). Similarly, the working set profile module(s) 104, etc. can monitor a portion of a program that extends from a user action to a point in time at which the program becomes responsive to the user (e.g., from a point at which a menu option is selected by the user to a point at which the selected option is provided to the user or from a point at which a user makes a selection until the program becomes responsive to the user).

As program 108 executes in process 110, working set profiler module(s) 104, etc. can identify the program entities (e.g., methods and functions) that are executed in the indicated region of the program, and can maintain this information in execution chains such as call chain 1 112, call chain 2 114, call chain 3 116, etc. The methods executed in each program path or logic branch in the monitored program or program portion can be maintained in a separate execution call chain. For example, if in a monitored execution of a portion of program 108, Method A calls Method B and Method B calls Method C, Method A, Method B and Method C can be maintained in call chain 1 112. If Method A also calls Method D and Method D calls Method E, Method A, Method D and Method E can be maintained in call chain 2 114. If Method F calls Method G, Method F and Method G can be maintained in call chain 3 116, and so on. It will be appreciated that any number of methods can be executed and any number of call chains can be generated by working set profiler module(s) 104, etc. Moreover, one call chain can be a subset of another call chain. For example, call chain x can be a subset of call chain 1 112, comprising Method B and Method C.

Thus, working set profiler module(s) 104, etc. can profile a program or a part or portion of a program to identify the methods that the program or portion of program executes. Working set profiler module(s) 104, etc. can aggregate the call chains into a call tree such as call tree 106. Working set profiler module(s) 104, etc. can determine the number of page touches that results from the execution of the chained methods maintained in each execution call chain of the call tree. Working set profiler module(s) 104, etc. can determine memory pages accessed associated with each method in each call chain. Working set profiler module(s) 104, etc. can categorize memory page accesses into shared accesses and exclusive accesses. "Shared access" or "shared memory access" refers to an access by one or more methods in one or more execution chains. In response to determining that an access to a page is shared by more than one method in the call tree, the page access can be assigned a category of "shared". "Exclusive access" or "exclusive memory access" refers to an access by only one method in the call tree. In response to determining that a memory page is accessed only by one method in the call tree, a memory page can be assigned a category of "exclusive". Categorization of accesses into shared and exclusive accesses can illustrate relationships between methods, call chains and particular memory accesses.

In FIG. 1, at least one method in call tree 106 accesses memory page 1 121, indicated by the arrow 131 drawn from call chain 1 112 to page 1 121. This page access is an exclusive page access because no other call chains in FIG. 1 access page 1 120. Call chain 1 112 also accesses page 2 123 of memory 144, indicated by the arrow 132 drawn from call chain 1 112 to page 2 123. Call chain 2 114 also accesses page 2 123, indicated by the arrow 133 drawn from call chain 2 114 to page 2 123. Because at least two call chains of call tree 106 access the same page, memory access to page 2 123 is a shared access and page 2 123 is a shared page. Call chain 3 116 accesses page 3 125, indicated by the arrow 134 drawn from call chain 3 116 to page 3 125. Because no other call chains access page 3 125, this is an exclusive memory access and page 3 125 is an exclusive page.

An exclusive page access in a critical path can be avoided by eliminating or postponing a particular method call in one execution call chain, the method accessing a particular memory page. When an exclusive page access is eliminated or is postponed to an area outside of the critical path, input/output operations (I/O) associated with the disk access are not performed thus decreasing latency associated with these operations. A shared page access in a critical path can be avoided by eliminating or postponing to an area outside of the critical path, an access that is made by at least two methods. The at least two method calls can be in one call chain or can be in two or more call chains. When a shared page access is eliminated or is postponed to an area outside of the critical path, input/output operations (I/O) associated with the disk access are not performed, thus decreasing latency associated with these operations. A critical path as used herein can comprise a portion of a program which is executed at startup (between the time a user initiates the program and the time the program becomes responsive to the user). A critical path can comprise a portion of a program that is executed in response to a user action (between the time a user initiates an action and the time the program becomes responsive to the user).

For example, suppose a particular critical path portion of a program includes a working set comprising 100 pages. In accordance with aspects of the subject matter disclosed herein, all call chains accessing each of those 100 pages can be found. Suppose that there are three call chains that access the same 20 pages at points within the critical path. By avoiding the identified three call chains, 20 page accesses can be avoided altogether. As each disk page typically comprises 4 KB (kilobytes) of data, a total of 80 KB of memory consumption can be avoided by avoiding the three call chains. Moreover, the I/O associated with the 20 page accesses can also be avoided and up to 20 disk page accesses can be avoided.

Figure 2A:
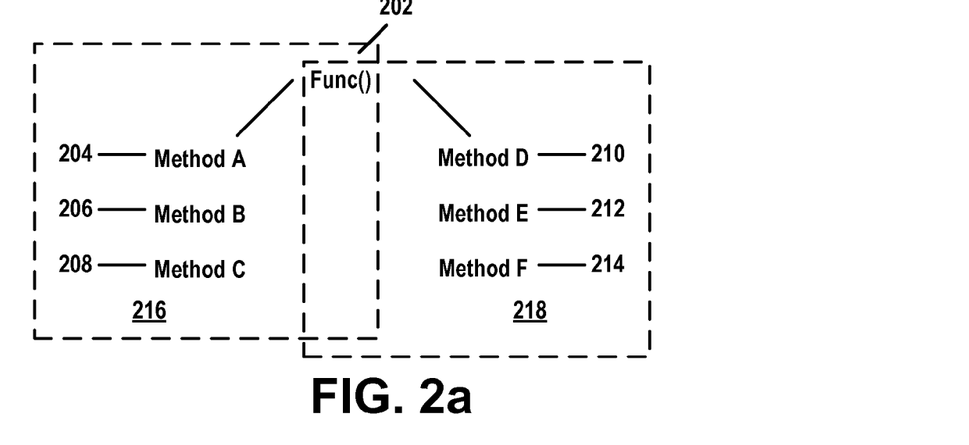
FIG. 2a is an illustration of an example of a call tree in accordance with aspects of the subject matter disclosed herein.

The working set profiler module(s) 104, etc. can create a call tree from the call chains. For example, call tree 106 can be created by aggregating call chain 1 112, call chain 2 114 and call chain 3 116. FIG. 2a illustrates an example of such a call tree in which a function called func( ) 202 calls a first method, Method A 204, Method A 204 calls a second method, Method B 206 and Method B 206 calls a third method, Method C 208. In FIG. 2a, function func( ) 202 also calls Method D 210. Method D 210 calls Method E 212 and Method E 212 calls Method F 214. One call chain is represented by the call chain 216 comprising func( ) 202, Method A 204, Method B 206 and Method C 208. A second call chain is represented by call chain 218 comprising func( ) 202, Method D 210, Method E 212 and Method F 214.

Figure 2B:
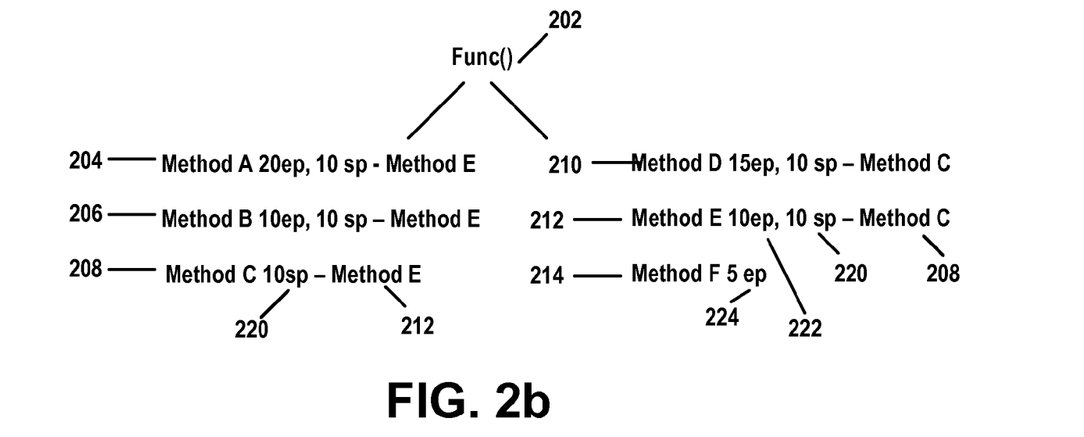
FIG. 2b is an illustration of an example of an augmented call tree in accordance with aspects of the subject matter disclosed herein.

The working set profiler module(s) 104, etc. can augment the call tree, augmenting each of the methods of each of the call chains with the number of memory pages accessed by each of the methods and whether the accessed memory pages are shared or exclusive. The call tree can also be augmented with the name of the method(s) with which memory pages are shared. For example, FIG. 2b illustrates the call tree of FIG. 2a, augmented with profile data that indicates, for example, that Method C 208 accesses 10 shared pages 220 and lists the name of the method (Method E 212) with which Method C 208 shares the 10 pages. Similarly, the call tree can be augmented with profile data that indicates that Method E 212 accesses 10 exclusive pages 222 and shares 10 pages 200 with Method C 208.

The number of pages displayed in the augmented call tree are additive. For example the 10 exclusive pages 222 accessed by Method E 212 include the 5 exclusive pages 224 accessed by Method F 214. By eliminating a method in a call tree, the methods below the eliminated method are also eliminated. For example, in the call tree of FIG. 2b, eliminating Method B 206 automatically eliminates Method C 208 because Method B 206 calls Method C 208. Any methods called by Method C 208 would also be eliminated and so on. Similarly, memory consumption and any I/O operations associated with shared and exclusive pages accessed by called methods are eliminated automatically when a calling method is eliminated. In accordance with aspects of the subject matter described herein, the number of exclusive pages are cumulative. Thus, for example, the 10 exclusive pages 222 accessed by Method E 212 include the 5 exclusive pages 224 accessed by Method F 214. Thus by eliminating a reference to a method, references to succeeding methods and associated disk access, I/O operations and memory consumption are eliminated. For example, removing a reference to Method F 214 results in 5 exclusive page access eliminations and elimination of associated I/O operations and memory consumption. Removing a reference to Method E 212 results in elimination of accesses to the 10 exclusive pages 222, where the eliminated 10 page accesses include the 5 exclusive page 224 accesses made by Method F 214. Elimination of Method E 212 does not eliminate the shared page accesses because Method C 208 accesses these pages.

Figure 2C:
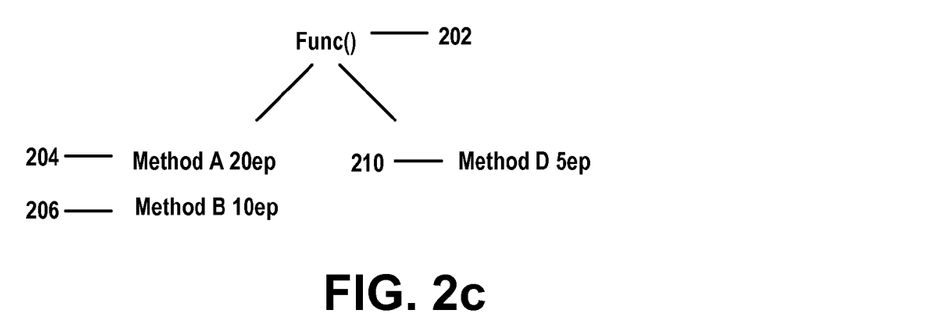
FIG. 2c is an illustration of an example of a reiterated augmented call tree in accordance with aspects of the subject matter disclosed herein.

Methods to be eliminated can be provided by receiving user input. The results of these eliminations are illustrated in FIG. 2c. It will be appreciated that Method C, Method E and Method F and their associated memory accesses have been eliminated. At this point, a new, reconstructed or modified call tree can be generated and augmented with updated page access information, category information and information identifying methods that access the same pages. This information can be processed, analyzed and displayed or otherwise provided to the user and another round of memory access eliminations can occur. This cycle can be repeated one or more times. Because some shared pages were eliminated, call chains with exclusive page accesses may increase, presenting additional opportunities to remove methods by following the procedures described above.

It will be appreciated that while the examples above have described methodologies based on call chains, similar results can be obtained using a type-based methodology. For example, suppose that Method B is a member of a first type A and Method D is a member of a second type B. Referring to FIG. 2c, elimination of all methods that belong to the first type would eliminate Method B, eliminating 10 exclusive page accesses and associated overhead (I/O and memory consumption). Eliminating all of the second type of methods would eliminate 5 exclusive page accesses and associated overhead.

The augmented call tree can be processed by the working set profiler module(s) 104, etc. The information in the augmented call tree can be processed to prioritize call chains so that, for example, the call chains having the greatest number of exclusive pages are indicated, the smallest number of call chains having the greatest number of shared pages are indicated and so on.

Figure 2D:
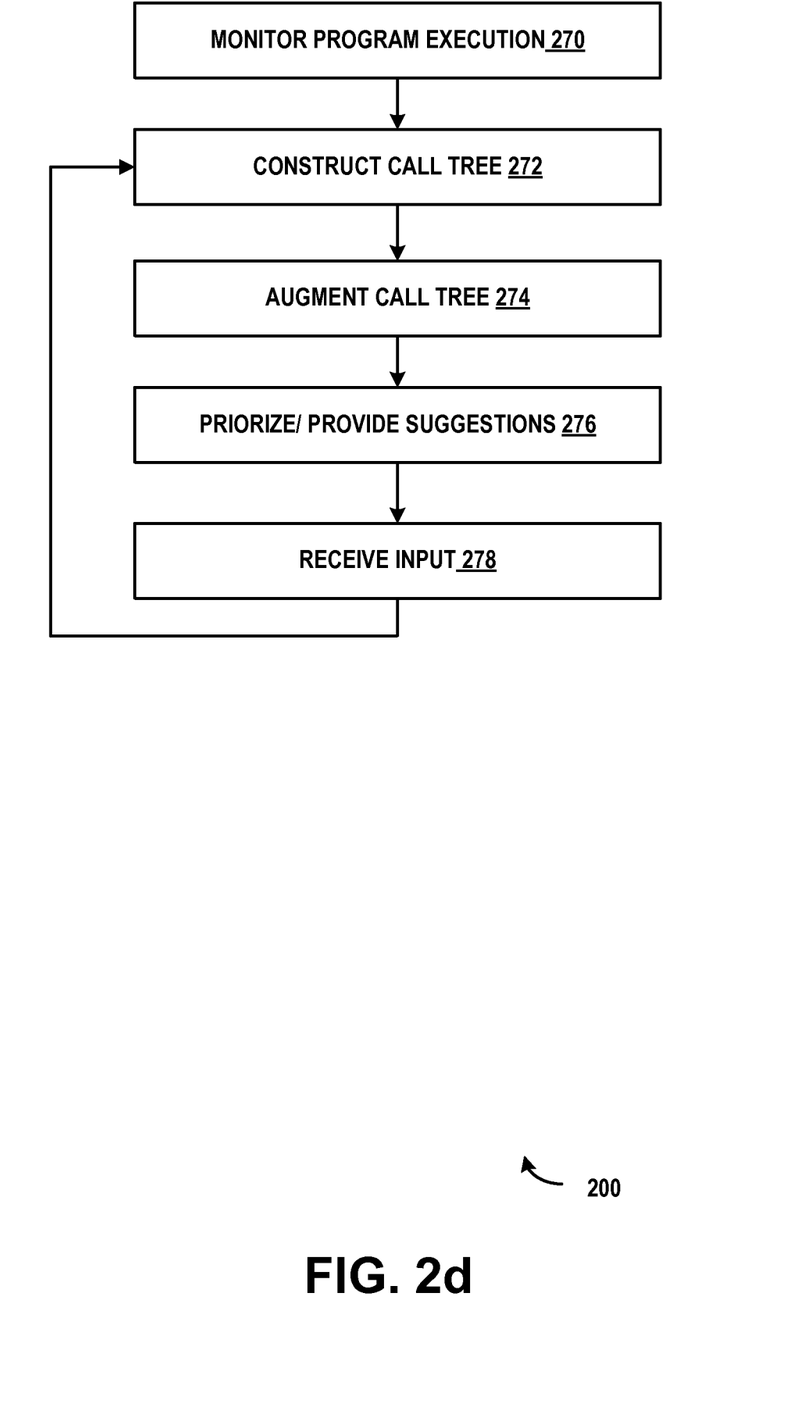
FIG. 2d is a flow diagram of an example of a method 200 that profiles the working set associated with a portion of program code in accordance with aspects of the subject matter disclosed herein.

FIG. 2d illustrates an example of a method 200 that can be used to profile working set and reduce latency as described herein. The method described in FIG. 2d can be practiced by a system such as but not limited to the one described with respect to FIG. 1. Some of the actions described below can be optional. Some of the actions described below can be executed in a sequence that differs from that described below. At 270 an executing program or a portion of an executing program execution can be monitored by a working set profiler module or modules as described above. The portion of the executing program that is monitored can be specified by user input.

At 272, one or more call trees as described above can be constructed. Each call tree can include a list of methods in sequence as called. For example, if function func( ) calls Method A, Method A calls Method B, and Method B calls Method C, a call tree can be constructed as displayed in FIG. 2a, that includes func( ) Method A, Method B and Method C. At 274, the constructed call chain can be augmented with working set profile information as described above. That is, the working set profiler module(s) can determine the page accesses associated with each method and can keep track of whether or not each of the pages accesses is exclusive (only associated with one method) or shared (associated with more than one method in the call tree). Thus, working set profile information can include a number of exclusive memory page accesses for each method in the call tree, a number of shared memory page accesses for each method in the call tree, and the name of the method with which the shared pages are shared.

At 276, the information in the call tree can be categorized and prioritized in various ways including but not limited to providing a list of methods in order by greatest number of exclusive memory pages referenced by the method, by listing methods in order by the greatest number of shared memory pages shared with the fewest number of methods or call chains and so on.

In response to user input provided at 278 indicating methods that can be eliminated or deferred to a portion of the program outside the critical path, a new call tree can be constructed at 272 and the processing cycle can continue one or more times. It will be appreciated that the subject matter disclosed herein, although described within the context of managed code, can be applied equally to any program code, including but not limited to constrained execution environments as can exist in small form factor devices including but not limited to smartphones, personal digital assistants and the like.

Example of a Suitable Computing Environment

Figure 3:
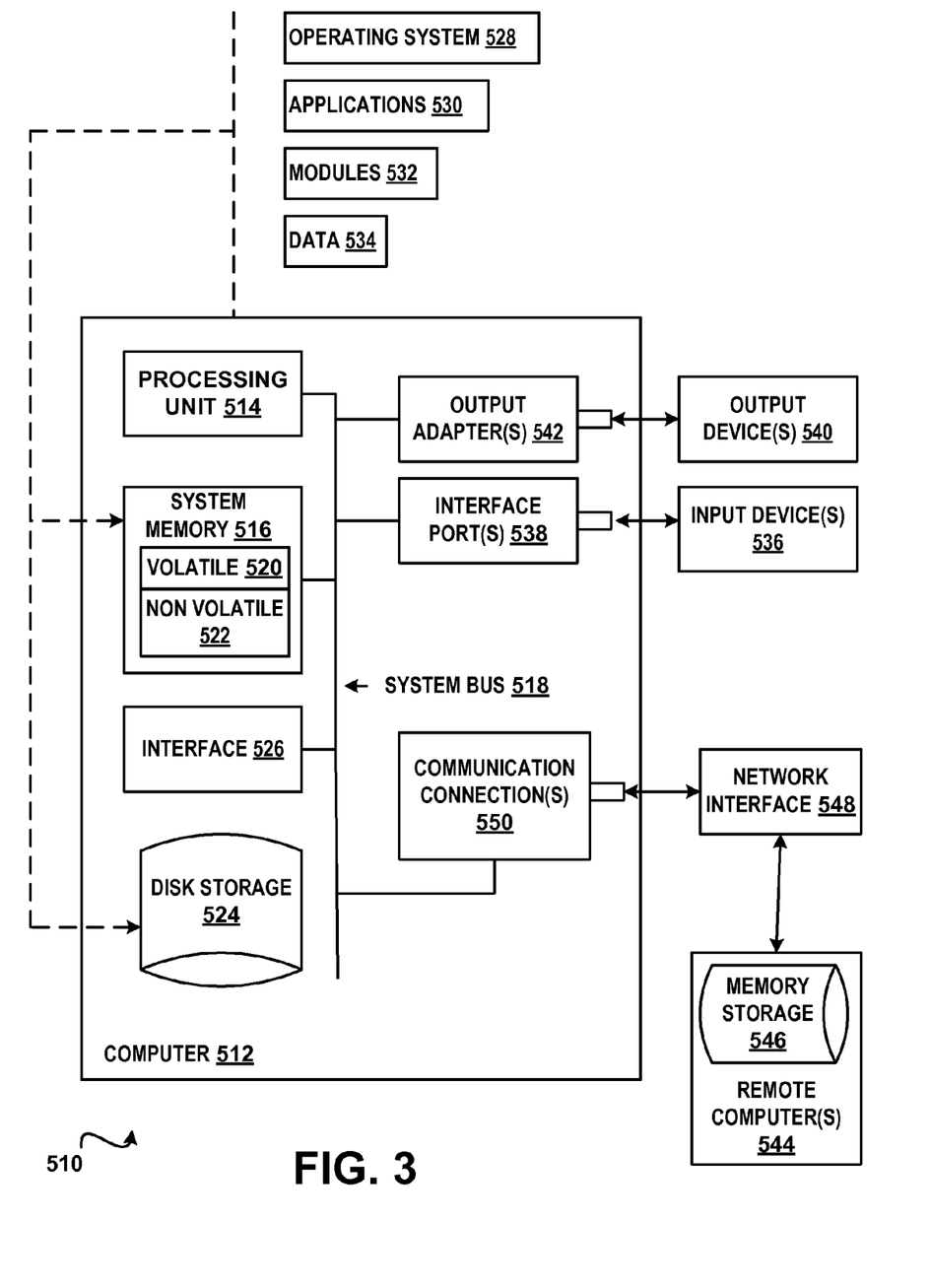
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
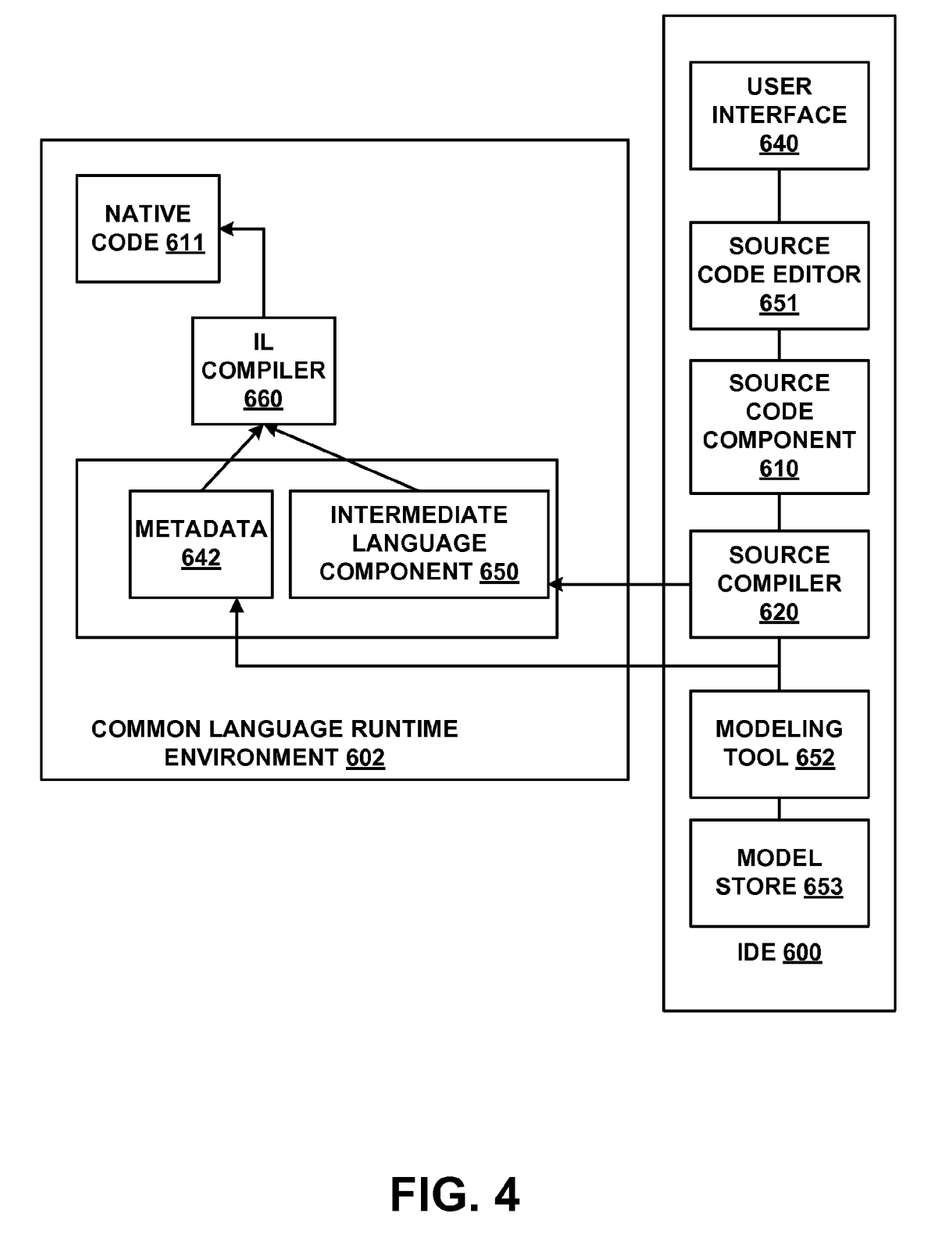
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    a processor and a memory of a computing device; and
    at least one module on the computing device configured to cause the processor of the computing device to:
        monitor a portion of an executing program;
        determine a sequence of methods executed during the monitored portion;
        construct a plurality of call chains from the sequence of methods executed during the monitored portion;
        aggregate the plurality of call chains into a call tree;
        determine at least one of a plurality of memory pages accessed by each of the methods in the call tree;
        categorize each of the plurality of memory pages as a shared or exclusive memory page, a shared memory page comprising a memory page that is accessed by at least two methods in the call tree and an exclusive memory page comprising a memory page accessed by a single method;
        augment each of the methods in the call tree with information comprising all memory pages accessed by the method, a category of each accessed memory page and for each shared memory page, the methods accessing the shared memory page; and display prioritized information comprising relationships between method references and memory page accesses.

2. The system of claim 1, wherein the monitored portion comprises an area of code executed between initiating the program and a point at which the program becomes responsive to a user.

3. The system of claim 1, wherein the monitored portion comprises an area of code executed between a user action and a point at which the program becomes responsive to a user.

4. The system of claim 1, wherein the information is prioritized by number of exclusive memory pages accessed.

5. The system of claim 1, wherein the information is prioritized by an algorithm that computes a priority value based on smallest number of methods that access greatest number of shared memory pages.

6. The system of claim 1, wherein the monitored methods comprise JIT-compiled methods and wherein prioritized information is displayed, the prioritized information identifying methods for which JIT-compilation can be avoided or deferred to a portion of the program outside of a critical path.

7. The system of claim 1, wherein the portion of the program monitored is user-specified.

8. A method comprising:
monitoring by a processor of a computing device an execution of a portion of a program;
determining a sequence of methods executed in the program portion;
constructing a plurality of call chains from the determined sequence of methods, each call chain of the plurality of call chains comprising a plurality of methods;
aggregating the plurality of call chains into a call tree;
determining all the memory pages accessed by each method of the plurality of methods in the call tree;
categorizing each memory page into a shared memory page in response to determining that a memory page was accessed by at least two methods in the call tree or an exclusive memory page in response to determining that the memory page was accessed by only one method in the call tree;
determining for each shared memory page, all the methods in the monitored portion that access the shared memory page;
augmenting the call tree with all the memory pages accessed for each method in the call tree, a shared or exclusive category for each memory page in the call tree and all the methods with which a shared memory page is shared;
displaying information derived from the augmented call tree on a display screen;
receiving methods to be eliminated from at least one call chain of the plurality of call chains of the call tree;
reconstructing the augmented call tree eliminating the received methods, and
displaying information derived from the reconstructed augmented call tree on a display screen.

9. The method of claim 8, wherein methods are categorized by type and the methods eliminated from the call chain are methods of a specified type.

10. The method of claim 8, wherein the displayed information comprises a list of methods in order of decreasing exclusive memory pages accessed.

11. The method of claim 8, wherein the displayed information comprises prioritized information based on an algorithm that assigns a priority based on greatest number of shared memory pages shared by a smallest number of methods.

12. The method of claim 8, wherein the methods to be eliminated are methods of a particular type.

13. The method of claim 8, further comprising:
monitoring memory allocations; and
displaying prioritized information that identifies memory allocations that can be avoided or deferred to a portion of the program outside of a critical path.

14. The method of claim 8, wherein the monitored portion of the program comprises an area of code between a user action and a point in the execution of the program at which the program becomes responsive to a user.

15. A computer-readable storage medium comprising computer-executable instructions which when executed cause at least one processor of a computing device to:
monitor a portion of an executing program;
determine a sequence of methods executed during the monitored portion;
construct a plurality of call chains from the sequence of methods executed during the monitored portion;
determine a plurality of memory page accesses associated with each of the methods;
assign a shared category to a memory page that is accessed by a plurality of methods executed during the monitored portion;
assign an exclusive category to a memory page that is accessed by only one method of only one call chain;
aggregate the plurality of call chains into a call tree;
augment each of the methods in the call tree with information comprising all memory page accesses for the method, the assigned category of each memory page access and for each shared memory page access, identification of all methods accessing the shared memory page;
display prioritized information regarding relationships between method references and memory page accesses.

16. The computer-readable storage medium of claim 15, comprising further computer executable instructions, which when executed cause the at least one processor to:
receive at least one method to be eliminated from at least one call chain.

17. The computer-readable storage medium of claim 16, comprising further computer executable instructions, which when executed cause the at least one processor to:
reconstruct the call tree by:
determining a plurality of memory page accesses associated with each of the remaining methods;
assigning a shared category to a memory page that is accessed by a plurality of methods;
assigning an exclusive category to a memory page that is accessed by only one method;
transform the plurality of call chains into a call tree;
augment each of the methods in the reconstructed call tree with information comprising all memory accesses for each method, the assigned category of each memory page access and for each shared memory page access, identification of all methods accessing the shared memory page; and
display prioritized information regarding relationships between method references and memory page accesses.

18. The computer-readable storage medium of claim 15, comprising further computer executable instructions, which when executed cause the at least one processor to:

receive user input specifying the monitored portion comprising an area of code executed between initiating a program and a point at which the program becomes responsive to a user.

19. The computer-readable storage medium of claim 15, comprising further computer executable instructions, which when executed cause at least one processor to:
list methods in decreasing order of number of exclusive memory pages accesses.

20. The computer-readable storage medium of claim 16, comprising further computer executable instructions, which when executed cause at least one processor to:
compute a priority value based on the smallest number of methods that access the greatest number of shared memory pages.

* * * * *